United States Patent
Youn et al.

(10) Patent No.: US 7,189,590 B2
(45) Date of Patent: Mar. 13, 2007

(54) METHOD OF FORMING LIQUID CRYSTAL CELL FOR LIQUID CRYSTAL DISPLAY DEVICE

(75) Inventors: Won-Gyun Youn, Gumi-si (KR); Su-Woong Lee, Gumi-si (KR); Byung-Ryol Seo, Incheon (KR)

(73) Assignee: LG. Philips LCD Co., Ltd., Seoul (KR)

( * ) Notice: Subject to any disclaimer, the term of this patent is extended or adjusted under 35 U.S.C. 154(b) by 284 days.

(21) Appl. No.: 10/963,617

(22) Filed: Oct. 13, 2004

(65) Prior Publication Data
US 2005/0101046 A1    May 12, 2005

(30) Foreign Application Priority Data
Oct. 13, 2003    (KR) .................... 10-2003-0071061

(51) Int. Cl.
*H01L 21/00*    (2006.01)
(52) U.S. Cl. ............................. 438/29; 438/30; 257/72
(58) Field of Classification Search .................. 438/29, 438/30, 34, 65, 66, 69; 257/59, 72, 88, 98; 349/73, 74, 187
See application file for complete search history.

(56) References Cited

U.S. PATENT DOCUMENTS 5,164,853 A * 11/1992 Shimazaki .................. 349/73
6,144,082 A * 11/2000 Yamazaki et al. .......... 257/412
6,195,149 B1 * 2/2001 Kodera et al. .............. 349/187
6,524,977 B1 * 2/2003 Yamazaki et al. .......... 438/799
6,870,594 B1 * 3/2005 Zhang ........................ 349/187

FOREIGN PATENT DOCUMENTS

| JP | A1 05-005885 | 1/1993 |
| JP | A2 05-181139 | 7/1993 |

* cited by examiner

*Primary Examiner*—Kevin M. Picardat
(74) *Attorney, Agent, or Firm*—Brinks Hofer Gilson & Lione

(57) ABSTRACT

A method of forming a liquid crystal cell for a liquid crystal display device includes defining a first cell region, second cell regions having smaller sizes than the first cell region, and a buffer region disposed between adjacent second cell regions on a first base substrate. After the regions are defined, elements are formed in the first and second cell regions and a buffer pattern is formed in the buffer region. An alignment layer is formed to cover the elements and the buffer pattern. The alignment layer is then rubbed along a direction from the second cell regions to the first cell region.

42 Claims, 18 Drawing Sheets

METHOD OF FORMING LIQUID CRYSTAL CELL FOR LIQUID CRYSTAL DISPLAY DEVICE

This application claims the benefit of Korean Patent Application No. 2003-0071061, filed in Korea on Oct. 13, 2003, which is hereby incorporated by reference for all purposes as if fully set forth herein.

BACKGROUND

1. Field

The invention relates to a liquid crystal display (LCD) device and more particularly, to a method of forming a liquid crystal cell for a liquid crystal display device.

2. Discussion of the Related Art

Liquid crystal display (LCD) devices have been spotlighted as a next generation display device having high value because of their low power consumption and good portability.

Optical anisotropy and the polarization characteristics of a liquid crystal material form the basis for driving an LCD device. Generally, an LCD device includes two substrates, which are spaced apart and face each other, and a liquid crystal layer interposed between the two substrates. Polarizers are disposed over outer surfaces of the two substrates, respectively. Each of the two substrates includes an electrode, and the electrodes of each substrate also face each other. Voltage applied to each electrode induces an electric field between the electrodes. Alignment of the liquid crystal molecules is changed by varying the intensity or direction of the electric field. The LCD device displays a picture by varying transmittance of the light according to the arrangement (or rearrangement) of the liquid crystal molecules.

An active matrix liquid crystal display (AMLCD) device, which includes thin film transistors as a switching element for a plurality of pixels, has widely used for flat television systems or monitors of portable computer systems due to its high resolution and fast moving images.

A related art LCD device will be described hereafter in detail with reference to figures.

FIG. 1 shows a schematic solid view illustrating a related art LCD device. In this LCD device, upper and lower substrates 10 and 30 are spaced apart from and face each other, and a liquid crystal layer 50 is interposed between the upper substrate 10 and the lower substrate 30.

A plurality of gate lines 32 and a plurality of data lines 34 are formed over the inner surface of the lower substrate 30 (i.e., the side facing the upper substrate 10). The gate and data lines 32 and 34 cross each other to define pixel regions P. A thin film transistor T serves as a switching element, and is formed at each crossing portion of the gate and data lines 32 and 34. An array of such thin film transistors T is arranged in a matrix form corresponding to crossings of gate and data lines 32 and 34. A pixel electrode 46, which is connected to the thin film transistor T, is formed in each pixel region P.

Although not shown in the figure, the thin film transistor T includes a gate electrode, a source electrode, a drain electrode, and a channel. A gate signal is applied to the gate electrode, and a data signal is applied to the source electrode. When the thin film transistor T turns on by the gate signal, the data signal is transmitted to the drain electrode from the source electrode through the channel.

The upper substrate 10 includes a color filter layer 12 and a common electrode 16 respectively formed on the inside (i.e., the side facing the lower substrate 30). Although not shown in detail in the figure, the color filter layer 12 includes three color filters of red (R), green (G), and blue (B) transmitting light in a specific wavelength range, and a black matrix blocks light in an area where liquid crystal molecules are not controlled. The black matrix is disposed between the color filters. Each color filter of the color filter layer 12 corresponds to the pixel electrode 46 at the pixel region P.

Upper and lower polarizers 52 and 54, each of which may be a linear polarizer that transmits only linearly polarized light parallel to its light transmission axis, are arranged over outer surfaces of the upper and lower substrates 10 and 30, respectively. Additionally, a backlight disposed over the outer surface of the lower polarizer 54 functions as a light source.

The LCD device may be fabricated through a liquid crystal (LC) cell process. The LC cell process includes interposing a liquid crystal material between two substrates, which have switching elements and pixel electrodes through a manufacturing process of an array substrate and color filters and a common electrode through a manufacturing process of a color filter substrate, respectively. The LC cell process may hardly include relatively repeated processes as compared with the array process and the color filter process. The LC cell process includes forming an alignment layer for aligning liquid crystal molecules, forming a cell gap, cell cutting, and injecting a liquid crystal material. A liquid crystal panel is manufactured through the above the LC cell process.

FIG. 2 is a schematic plan view illustrating a cell arrangement on a motherglass for an LC cell process according to the related art.

As shown in FIG. 2, a cell region IIA in which array elements 62 are formed is defined on a motherglass 60. The cell region IIA becomes a cell through a cutting process to be performed later.

Although not shown in the figure, the cell region IIA includes a first area in the middle portion and a second area at the edge of the first area. A region except for the cell region IIA corresponds to a dummy region IIB, which is thrown away after the cutting process.

The motherglass may correspond to a base substrate on which a plurality of cell regions may be defined. Although the base substrate is made of glass, the base substrate may be made of plastic.

The LCD device may be used for various display devices and may have various sizes of substrates. It is difficult to form motherglasses according to the size. Thus, according to circumstances, because the dummy region may increase in the motherglass, the material cost substantially increases accordingly.

To solve the above problem, a multi-model on glass (MMG) method has been proposed. To improve utilization of the dummy region of the motherglass, in the MMG method, a large size cell and small size cells are arranged on one motherglass.

FIG. 3 is a schematic plan view illustrating an LC cell arrangement in an MMG method according to the related art. In FIG. 3, a first cell region IIIA and two second cell regions IIIB are arranged on one motherglass 70 and spaced apart from each other. The first cell region IIIA has a first size and the second cell regions IIIB have a second size smaller than first size.

The structure of FIG. 3 improves the utilization efficiency of the dummy region as compared with a structure in which only one size substrate is arranged on the motherglass, and the material costs are reduced.

However, in the related art MMC method, a rubbing process is performed along a vertical direction R in the context of the figure, that is, a direction from the second cell regions IIIB to the first cell region IIIA. At this time, rubbing properties of the first cell region IIIA may be lowered due to a step in a portion between the second cell regions IIIB.

FIGS. 4A and 4B illustrate a rubbing process according to the related art. FIG. 4A is a cross-sectional view along the line IVA—IVA of FIG. 3 and FIG. 4B is a cross-sectional view along the line IVB—IVB of FIG. 3.

In FIG. 4A, a first cell region IIIA and a second cell region IIIB are spaced apart on a motherglass 70. A first array element 74 and a first alignment layer 76 are sequentially formed in the first cell region IIIA. A second array element 78 and a second alignment layer 80 are sequentially formed in the second cell region IIIB.

Although not shown in the figure, each of the first and second array elements 74 and 78 includes a gate line, a data line, a thin film transistor, and a pixel electrode. A color filter element may be formed in place of the array element.

The first and second alignment layers 76 and 80 are rubbed with a rubbing fabric 84, which has a plurality of pile yarns 82 at a surface thereof, to thereby form grooves (not shown) along a predetermined direction on the first and second alignment layers 76 and 80. Depths of the grooves depend on a force pressed by the rubbing fabric 84.

In FIG. 4B, the first cell region IIIA is disposed on the motherglass 70, and is rubbed with the same rubbing fabric 84 as that of FIG. 4A. At this time, since there is no cell region before the first cell region IIIA, the first cell region IIIA is directly rubbed by the rubbing fabric 84, which is not previously pressed in a portion corresponding to a space between the second cell regions IIB of FIG. 3. Thus, the first cell region IIIA of FIG. 4B is less pressed by the rubbing fabric 84 than the first cell region IIIA of FIG. 4A. Accordingly, arrangements of liquid crystal molecules differ in positions, to thereby lower an image quality.

SUMMARY

By way of introduction only, in one embodiment, a method of forming a liquid crystal cell for a liquid crystal display device includes defining a first cell region, second cell regions having different sizes (e.g. smaller) than the first cell region, and a buffer region disposed between adjacent second cell regions on a first base substrate, forming elements in the first and second cell regions, forming a buffer pattern in the buffer region, forming an alignment layer covering the elements and the buffer pattern, and rubbing the alignment layer along a first direction from the second cell regions to the first cell region. The elements in the first and/or second cell regions are substantially the same thickness as the buffer pattern in the buffer region.

In another embodiment, a substrate contains a first cell region, second cell regions having different sizes than the first cell region, and a buffer region disposed between adjacent second cell regions on a first base substrate. Elements are disposed in the first and second cell regions and a buffer pattern is disposed in the buffer region. An alignment layer covers the elements and the buffer pattern. The elements in the first and/or second cell regions are substantially the same thickness as the buffer pattern in the buffer region.

It is to be understood that both the foregoing general description and the following detailed description are exemplary and explanatory and are intended to provide further explanation of the invention as claimed. Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to embodiments of the invention, which are illustrated in the accompanying drawings.

Figure 1:
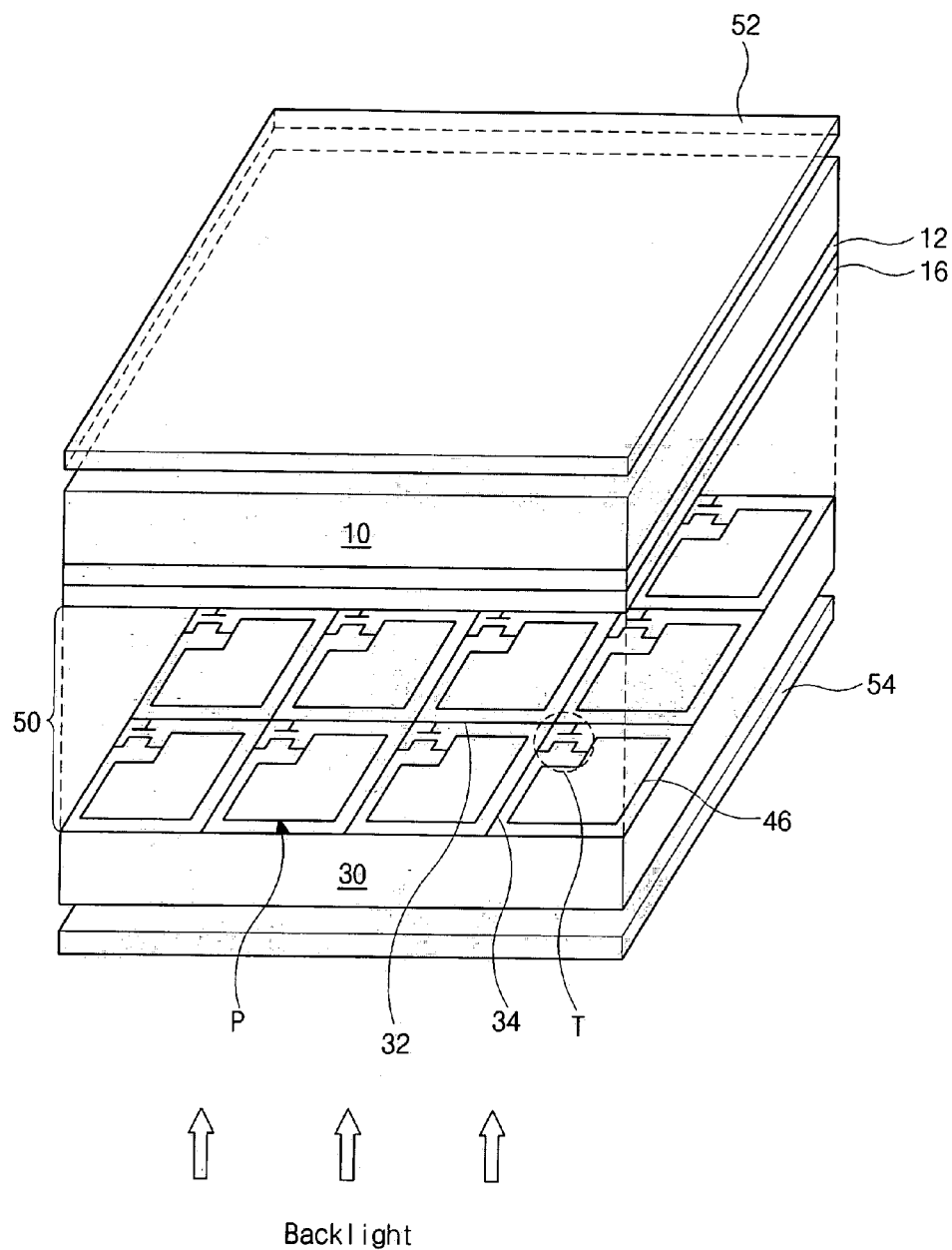
FIG. 1 is a schematic solid view illustrating a related art LCD device.
Figure 2:
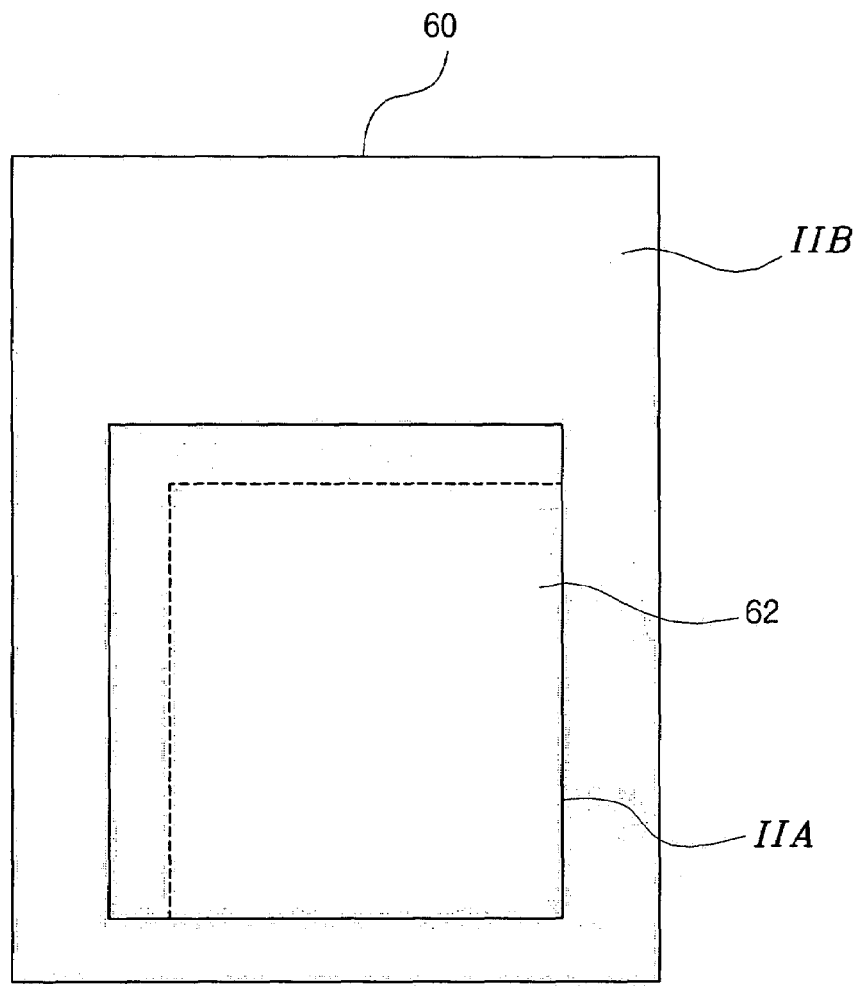
FIG. 2 is a schematic plan view illustrating a cell arrangement on a motherglass for an LC cell process according to the related art.
Figure 3:
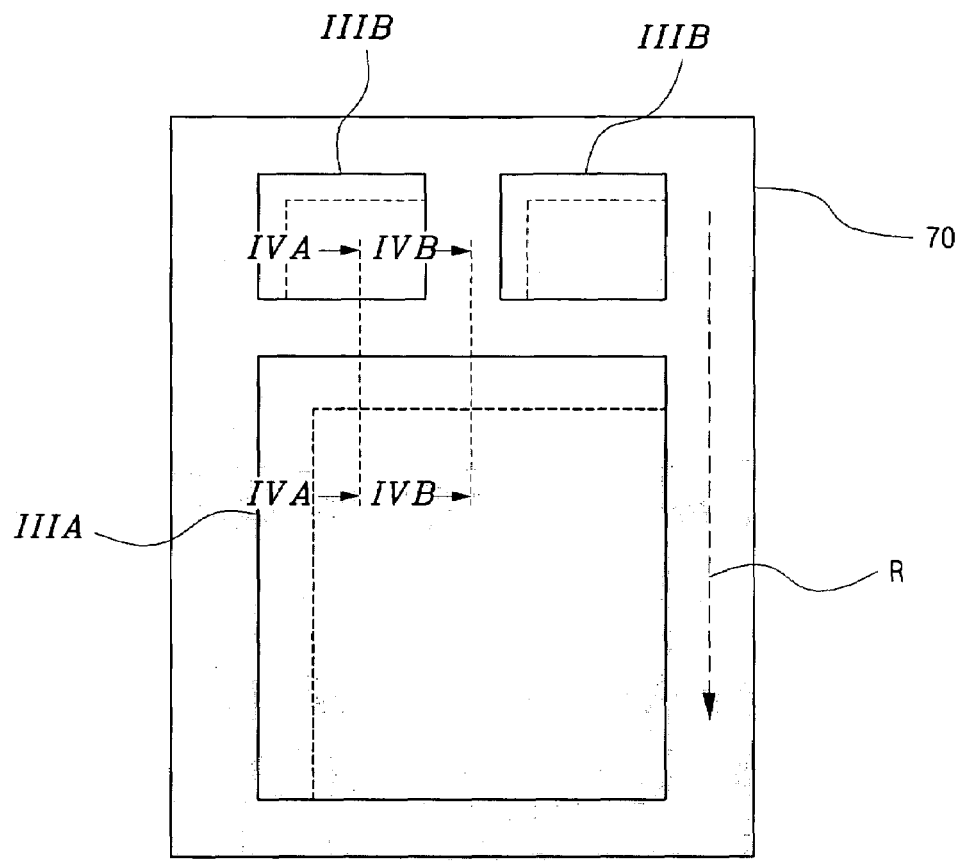
FIG. 3 is a schematic plan view illustrating an LC cell arrangement in an MMG (multi-model on glass) method according to the related art.
Figure 4A:
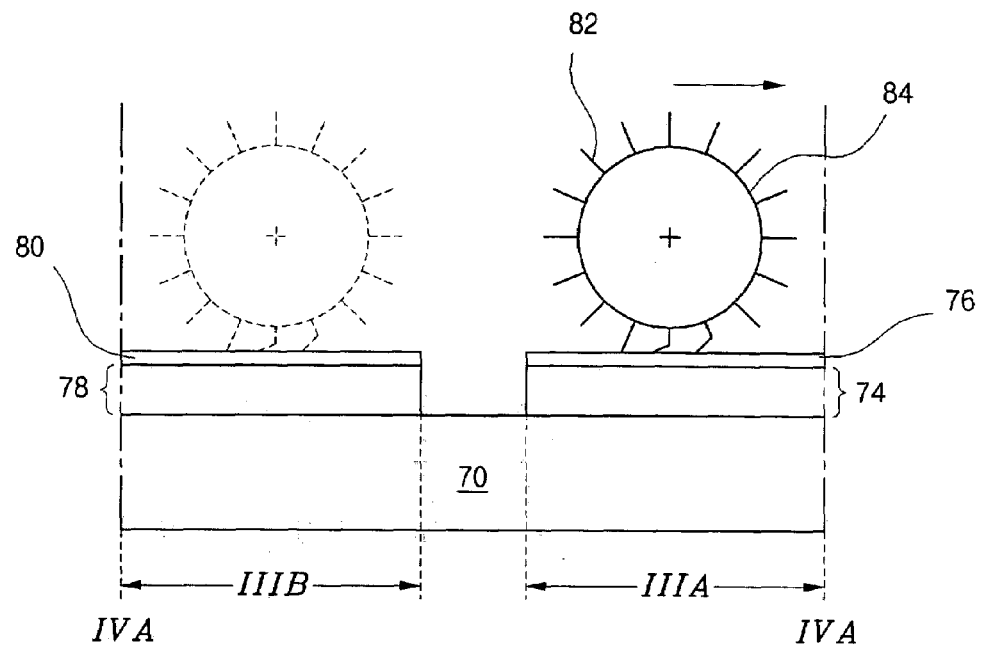
FIGS. 4A and 4B illustrate a rubbing process according to the related art, and are cross-sectional views along the line IVA—IVA and the line IVB—IVB of FIG. 3, respectively.
Figure 4B:
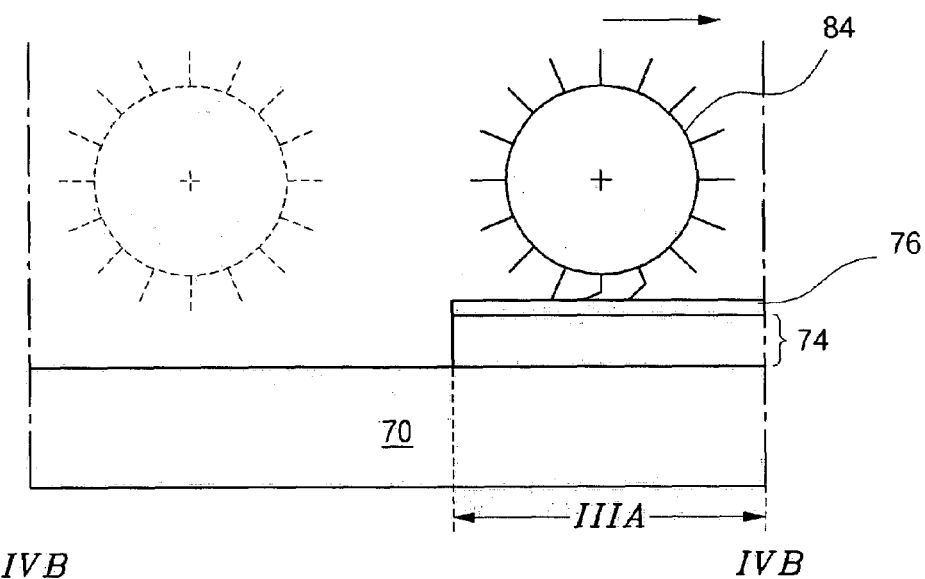
Figure 5:
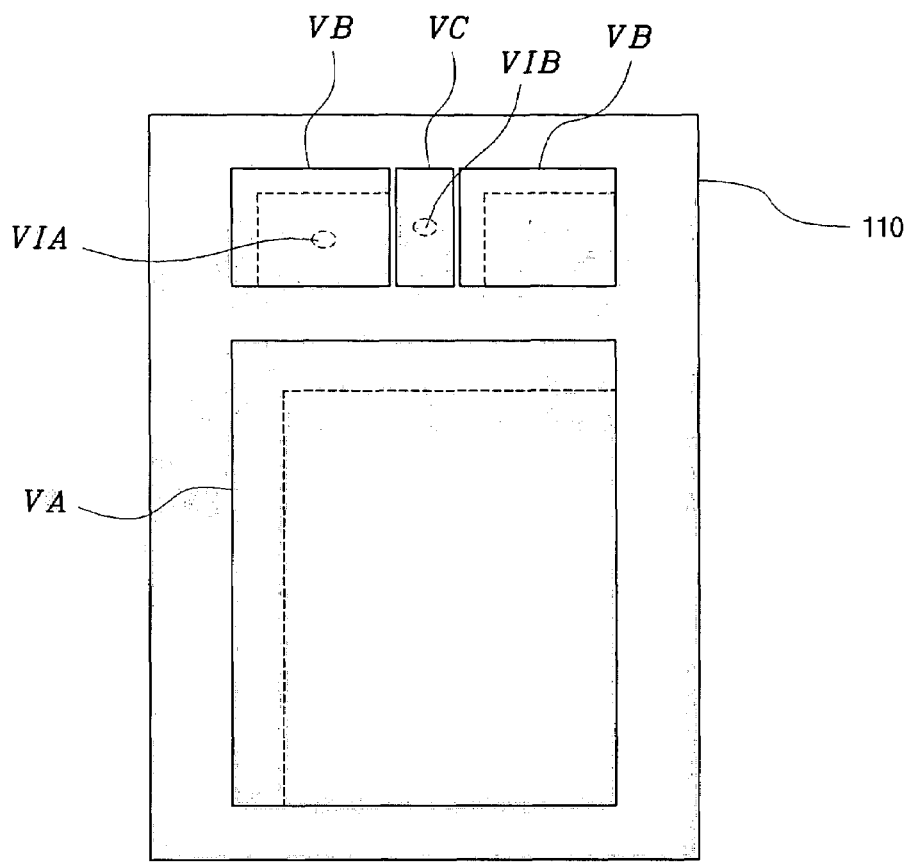
FIG. 5 is a schematic plan view illustrating an LC cell arrangement in an MMG method according to a first embodiment of the present invention.

FIG. 5 is a schematic plan view illustrating an LC cell arrangement in an MMG (multi-model on glass) method according to a first embodiment of the present invention.

As illustrate in FIG. 5, a first cell region VA and two second cell regions VB are defined on a motherglass 110 spaced apart from each other. The first cell region VA has a first size and the second cell regions VB have a second size smaller than the first size. A buffer region VC is disposed between the second cell regions VB. The first cell region VA may be disposed in a lower portion of the motherglass 110 in the context of the figure and the second cell regions VB and the buffer region VC may be disposed in an upper portion of the motherglass 110 in the context of the figure.

The buffer region VC may have a smaller size than the second cell regions VB. Layers of the buffer region VC may have the same thickness as layers of the second cell regions VB and may be formed through the same processes as the layers of the second cell regions VB without additional processes.

Figure 6A:
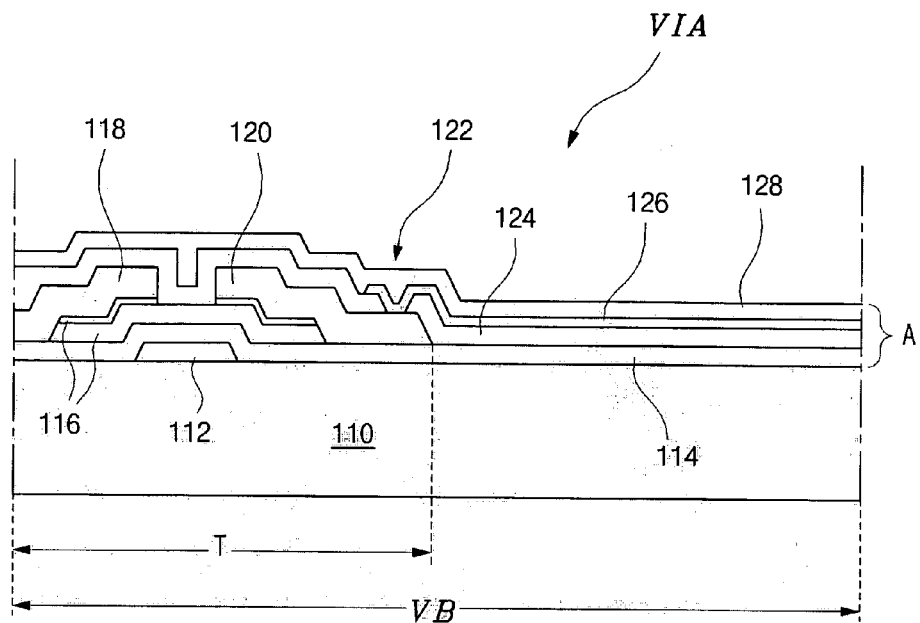
FIGS. 6A and 6B are cross-sectional views of the region VIA and the region VIB of FIG. 5, respectively.
Figure 6B:
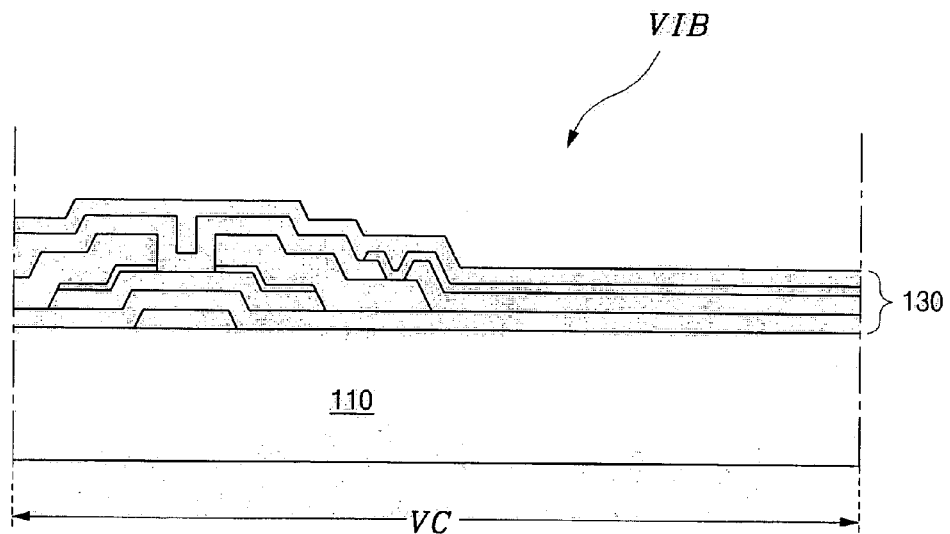

FIGS. 6A and 6B are cross-sectional views illustrating pixel areas of the second cell region and the buffer region of FIG. 5, respectively. FIG. 6A is an enlarged view of the region VIA of FIG. 5 and FIG. 6B is an enlarged view of the region VIB of FIG. 5.

In FIG. 6A, a gate electrode 112 is formed on a motherglass 110 and a gate insulating layer 114 is formed on the gate electrode 112. A semiconductor layer 116 is formed on the gate insulating layer 114 over the gate electrode 112. Source and drain electrodes 118 and 120 are formed on the semiconductor layer 116 and are spaced apart from each other. The semiconductor layer 116 may include an amorphous silicon layer and an impurity-doped amorphous silicon layer sequentially formed.

Although not shown in the figure, a gate line connected to the gate electrode 112 is formed in a first direction and a data line connected to the source electrode 118 is formed in a second direction crossing the first direction. The gate electrode 112, the semiconductor layer 116, the source electrode 118, and the drain electrode 120 constitute a thin film transistor T.

A passivation layer 124 covers the thin film transistor T and has a drain contact hole 122 exposing a part of the drain electrode 120. A pixel electrode 126 is formed on the passivation layer 124 and is connected to the drain electrode 120 through the drain contact hole 122. An alignment layer 128 is formed on an entire surface of the second cell region VB, covering the pixel electrode 126.

The thin film transistor T, the pixel electrode 126 and the alignment layer 128 may be referred to as an array element A.

The array element A of FIG. 6 may be formed through five mask processes.

In FIG. 6B, a buffer pattern 130 is formed on the motherglass 110 in the buffer region VC, wherein the buffer pattern 130 may have the same layered-structure as the array element A of FIG. 6A. That is, the buffer pattern 130 may be formed through the same manufacturing processes as the array element A of FIG. 6A of the second cell region VB of FIG. 6A. The buffer pattern 130 may have the same thickness as the array element A of FIG. 6A. Therefore, when a rubbing process is performed, a rubbing fabric is uniformly pressed due to the buffer pattern 130, so that the first cell region VA of FIG. 5 may have uniform rubbing properties.

In the first embodiment, although the five mask processes may be used, there is no limitation in the number of mask processes. On the other hand, the buffer region VC may be also used when a color filter substrate is fabricated.

Figure 7:
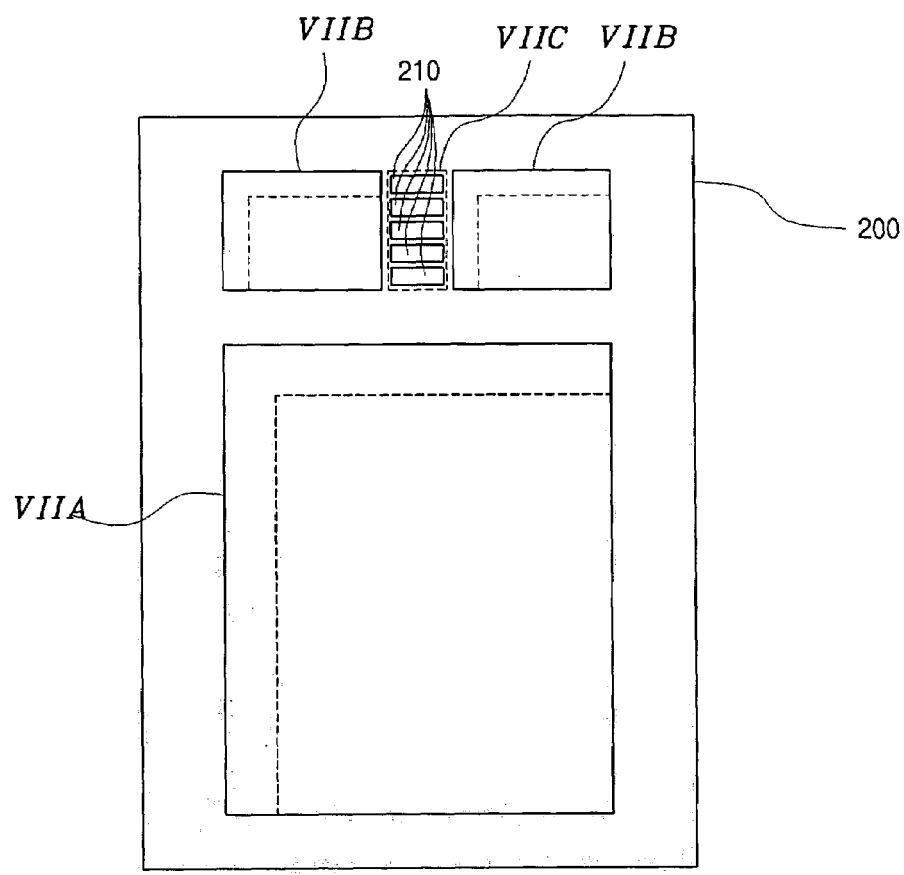
FIG. 7 is a schematic plan view illustrating an LC cell arrangement in an MMG method according to a second embodiment of the present invention

FIG. 7 shows a schematic plan view illustrating an LC cell arrangement in an MMG method according to a second embodiment of the present invention.

As shown in FIG. 7, a first cell region VIIA and two second cell regions VIIB are defined on a motherglass 200 spaced apart from each other. The first cell region VIIA may be disposed in a lower portion of the motherglass 200 in the context of the figure and the second cell regions VIIB may be disposed in an upper portion of the motherglass 200 in the context of the figure.

A buffer region VIIC is defined between the second cell regions VIIB. The buffer region VIIC includes a plurality of buffer patterns 210, each of which has a rod shape and is formed along a horizontal direction in the context of the figure. The plurality of buffer patterns 210 are sequentially arranged along a vertical direction in the context of the figure. The plurality of buffer patterns 210 may be formed through the same processes as the layers of the first and second cell regions VIIA and VIIB without additional processes.

FIGS. 8A and 8B, 9A and 9B, 10A and 10B, 11, 12, and 13A to 13B illustrate a manufacturing process of an LCD device using an LC arrangement of an MMC method according to the present invention. For convenience of explanation, a substrate for an array substrate is disposed over a substrate for a color filter substrate through the drawings.

Figure 8A:
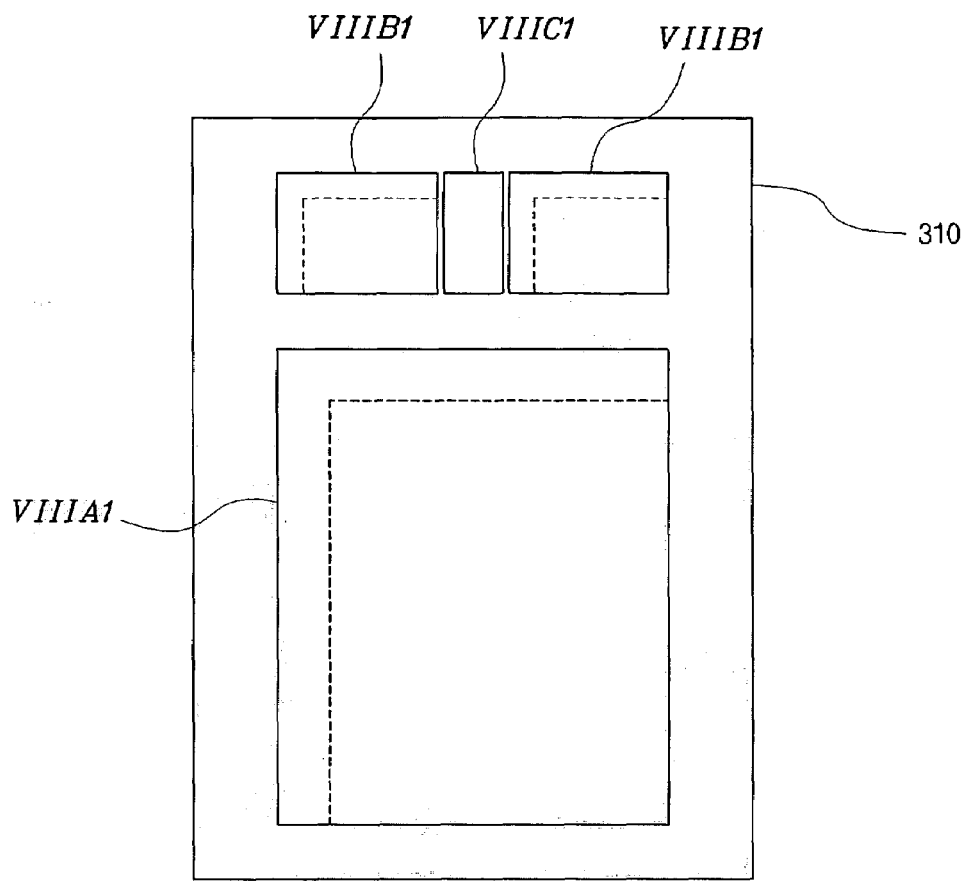
FIGS. 8A and 8B, 9A and 9B, 10A and 10B, 11, 12, and 13A to 13C are views illustrating a manufacturing process of an LCD device using an LC arrangement of an MMC method according to the present invention.
Figure 8B:
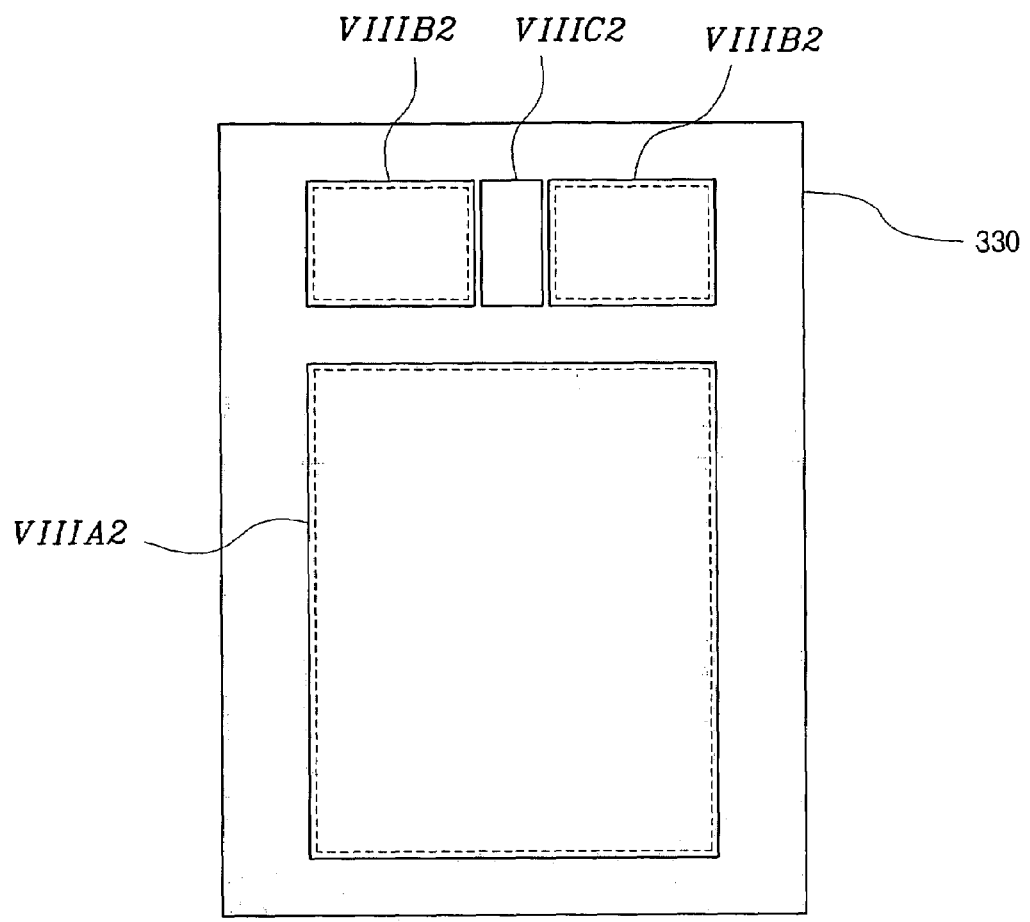

In FIGS. 8A and 8B, first cell regions VIIIA1 and VIIIA2 and second cell regions VIIIB1 and VIIIB2 are defined on first and second motherglasses 310 and 330, respectively. The first cell regions VIIIA1 and VIIIA2 have a first size and the second cell regions VIIIB1 and VIIIB2 have a second size smaller than the first size. Buffer regions VIIIC1 and VIIIC2 are defined between the second cell regions VIIIB1 and VIIIB2.

One first cell region VIIIA1 or VIIIB2 may be disposed in a lower portion of the motherglass 310 or 330 in the context of the figures and two second cell regions VIIIB1 or VIIIB2 may be disposed in an upper portion of the motherglass 310 or 330 in the context of the figures.

Although not shown in the figures, array elements are formed in the first and second cell regions VIIIA1 and VIIIB1 of the first motherglass 310, and color filter elements are formed in the first and second cell regions VIIIA2 and VIIIB2.

The buffer regions VIIIC1 and VIIIC2 may have layers of the same thickness as elements of the second cell regions VIIIB1 and VIIIB2. For example, in the first motherglass 310, buffer patterns (not shown), which are formed in the buffer region VIIIC1, may be formed through the same processes as the array element of the second cell regions VIIIB1. In the second motherglass 330, buffer patterns (not shown), which are formed in the buffer region VIIIC2, may be formed through the same processes as the color filter element of the second cell regions VIIIB2.

Figure 9A:
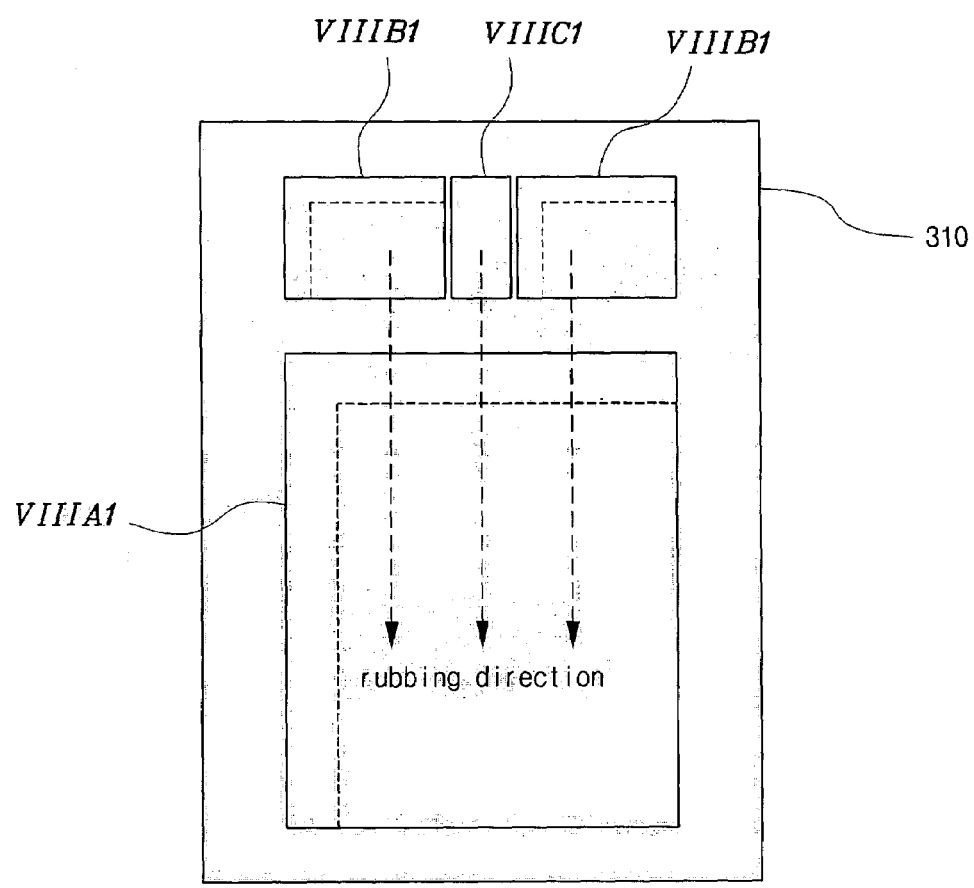
Figure 9B:
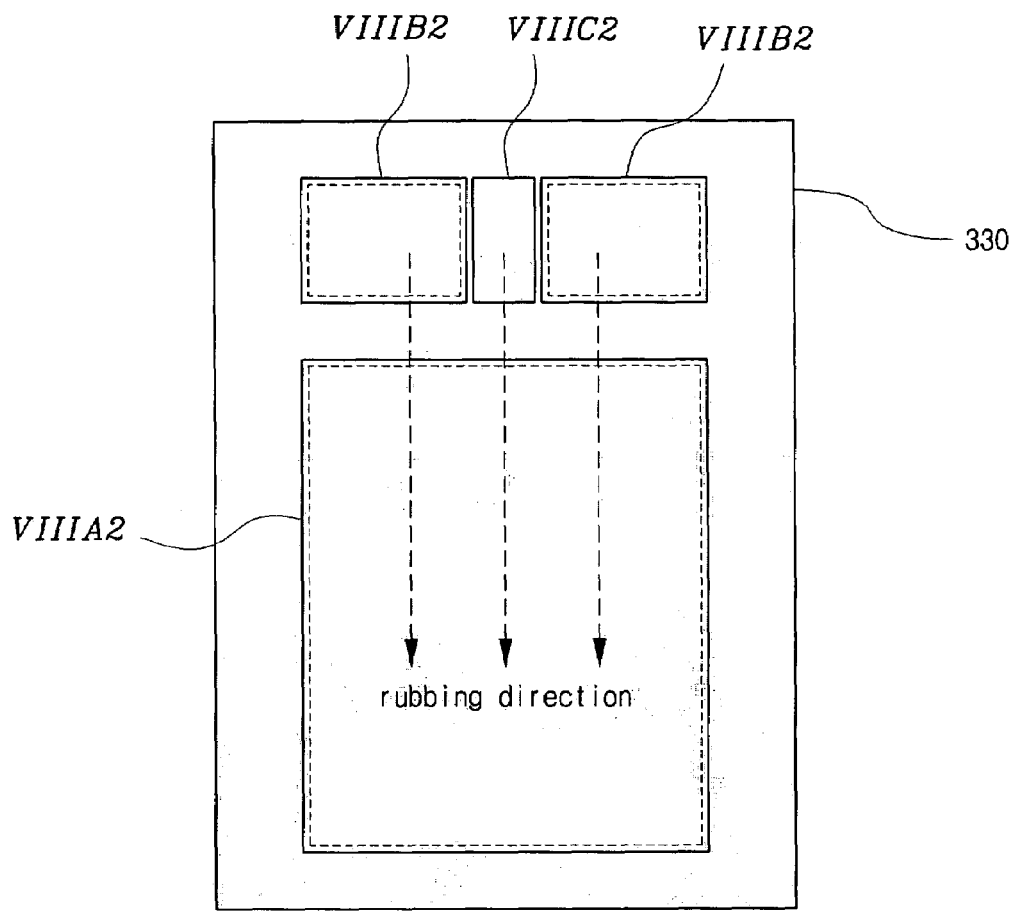

In FIGS. 9A and 9B, alignment layers (not shown) are formed the first and second motherglasses 310 and 330, and rubbing processes are performed on the motherglass 310 and 330, respectively, in which the first and second cell regions VIIIA1 and VIIIA2 and VIIIB1 and VIIIB2 are defined. Each rubbing process is carried out along a direction from an upper portion of the motherglass 310 or 330 to a lower portion of the motherglass 310 or 330 in the context of the figures. At this time, the first cell regions VIIIA1 and VIIIA2 are uniformly rubbed due to the buffer regions VIIIC1 and VIIIC2 between the second cell regions VIIIB1 and VIIIB2.

Figure 10A:
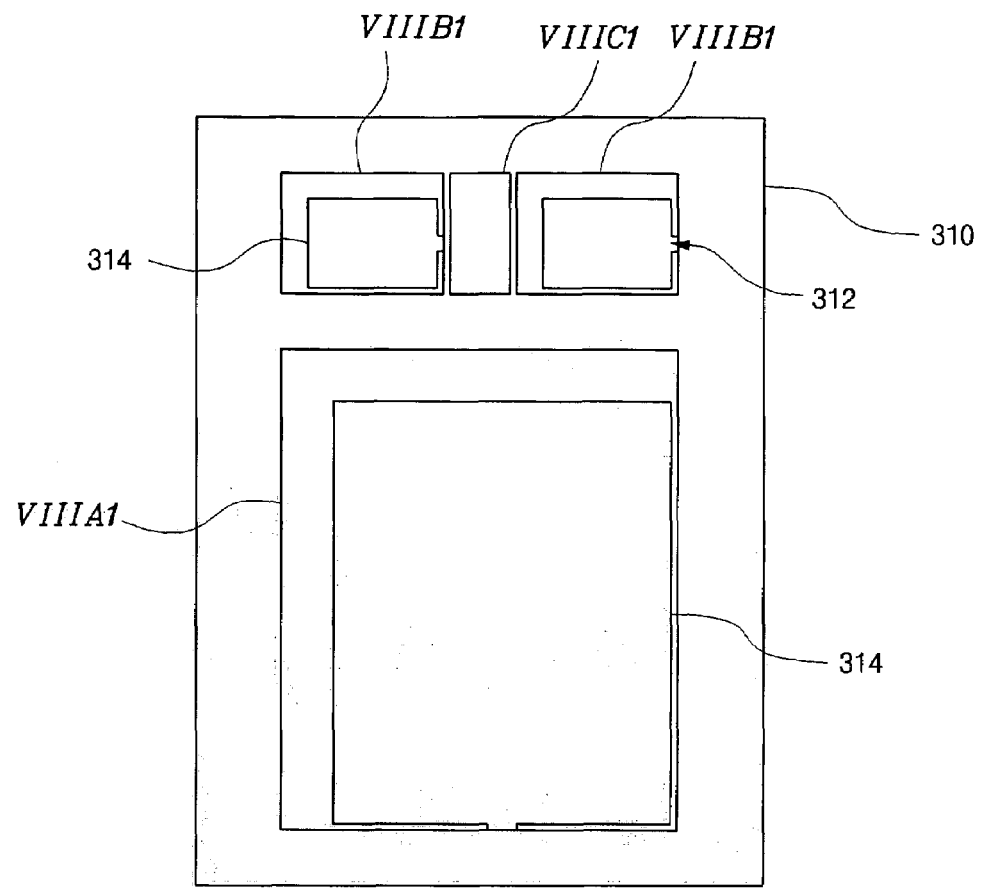
Figure 10B:
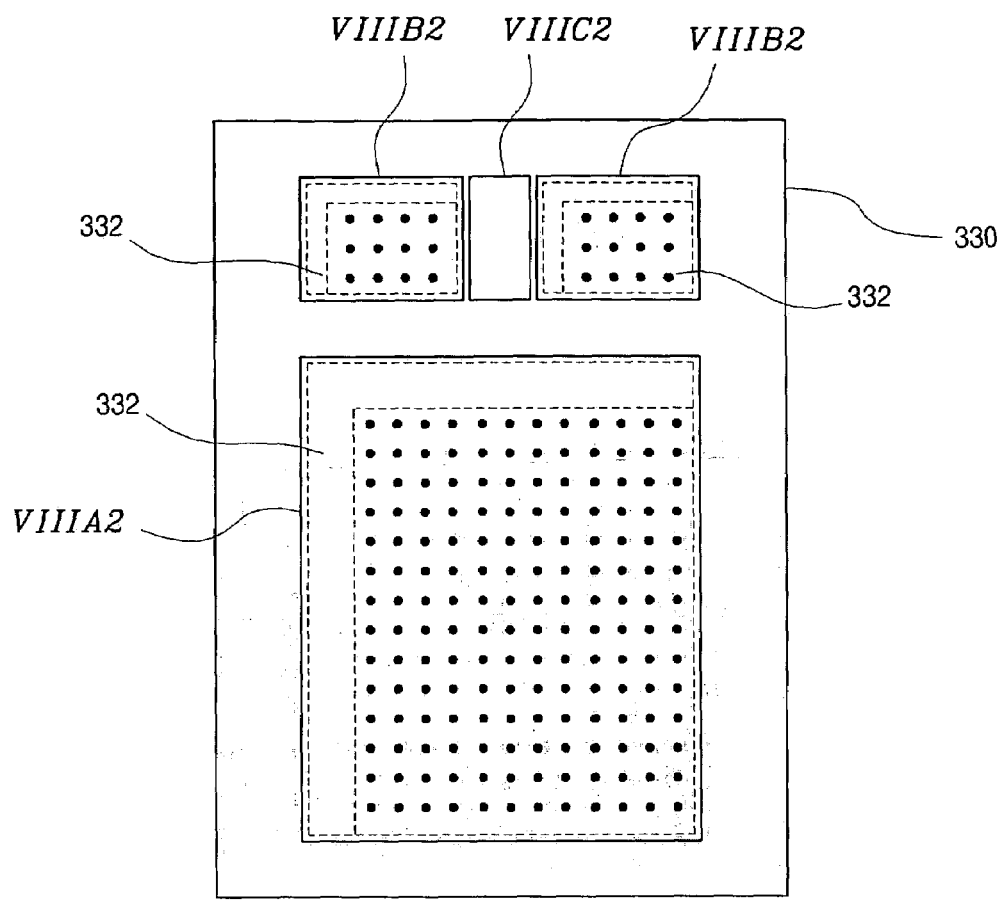

In FIG. 10A, seal patterns 314 having liquid crystal injection holes 312 are formed in peripheral portions of the first and second cell regions VIIIA1 and VIIIB1 of the first motherglass 310, which is rubbed. In FIG. 10B, spacers 332 are sprayed on the first and second cell regions VIIIA2 and VIIIB2 of the second motherglass 330.

Figure 11:
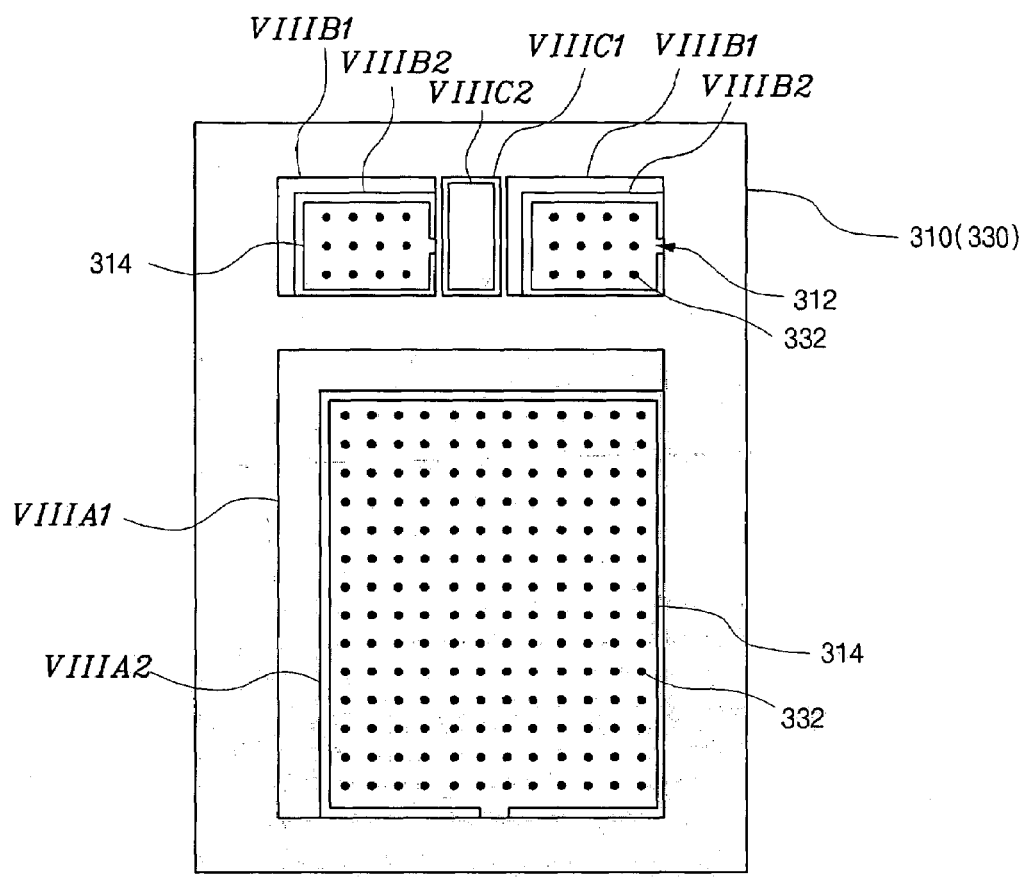

In FIG. 11, the first and second motherglasses 310 and 330 are attached by using the seal patterns 314 in the first and second cell regions VIIIA1 and VIIIB1 of the first motherglass 310. The spacers 332 in the first and second cell regions VIIIA2 and VIIIB2 of the second motherglass 330 keep cell gaps uniform.

Figure 12:
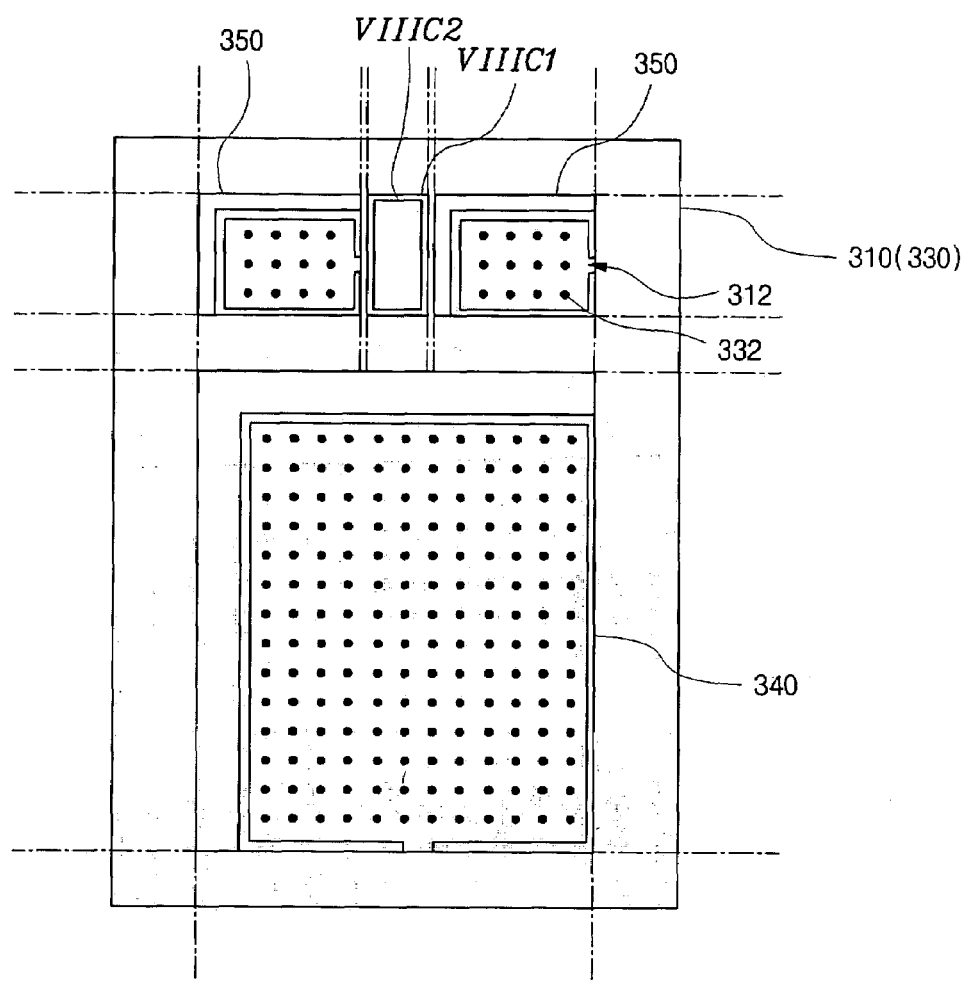

In FIG. 12, the attached first and second motherglasses 310 and 330 are cut along edges of the first and second cell regions to thereby form a first liquid crystal cell 340 and two second liquid crystal cells 350. The buffer regions VIIIC1 and VIIIC2 are thrown away after cutting.

Figure 13A:
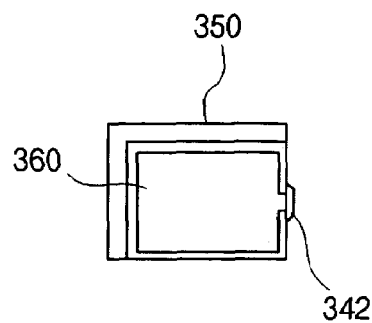
Figure 13B:
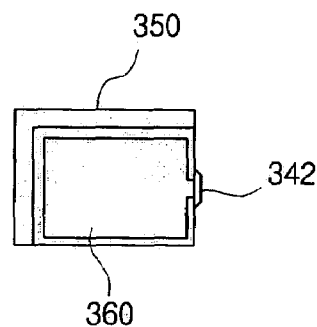
Figure 13C:
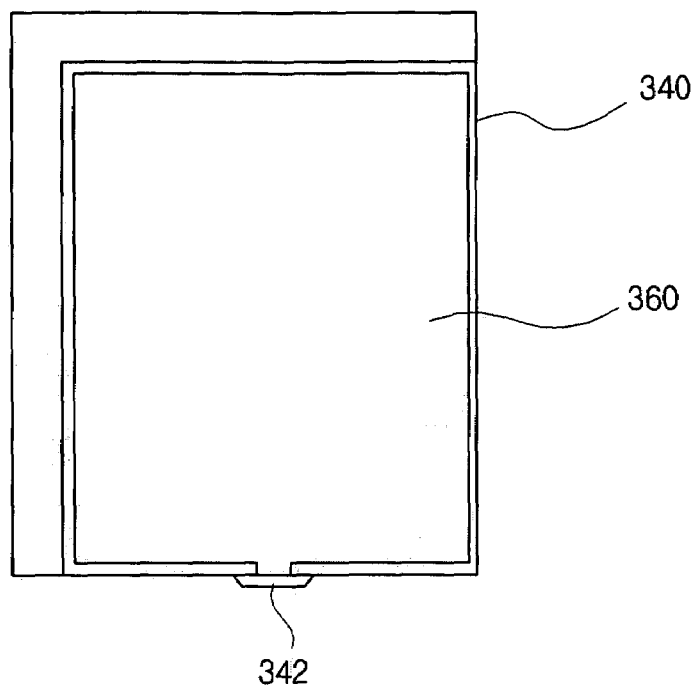

In FIGS. 13A to 13C, liquid crystal materials are injected into each of the first and second liquid crystal cells 340 and 350 through the liquid crystal injection holes 312 of FIG. 12 to thereby form a liquid crystal layer 360 in each of the first and second liquid crystal cells 340 and 350. Then, each liquid crystal injection hole 312 of FIG. 12 is sealed by using a sealing material 342.

Next, although not shown in the figures, liquid crystal display devices are completed by attaching polarizers on the first or second liquid crystal cell 340 or 350 selected through a quality test and then connecting driving circuits to the first or second liquid crystal cell 340 or 350.

In the present invention, cell regions of different sizes are defined on a motherglass and a rubbing process is performed along a direction from small cells to a large cell. At this time, a buffer pattern is formed between the small cell regions through the same processes as layers of the cell regions. Therefore, the large cell is uniformly rubbed without additional processes, and productivity is improved.

It will be apparent to those skilled in the art that various modifications and variations can be made in the fabrication and application of the invention without departing from the spirit or scope of the invention. Thus, it is intended that the invention cover the modifications and variations of this invention provided they come within the scope of the appended claims and their equivalents.

What is claimed is:

1. A method of forming a liquid crystal cell for a liquid crystal display device, the method comprising:
   defining a first cell region, second cell regions having smaller sizes than the first cell region, and a buffer region disposed between adjacent second cell regions on a first base substrate;
   forming elements in the first and second cell regions;
   forming a buffer pattern in the buffer region;
   forming an alignment layer covering the elements and the buffer pattern; and
   rubbing the alignment layer along a first direction from the second cell regions to the first cell region.

2. The method according to claim 1, wherein the second cell regions are disposed at a side of the first cell region and are spaced apart from each other in a second direction perpendicular to the first direction.

3. The method according to claim 1, wherein the buffer pattern and the elements are formed in the same process.

4. The method according to claim 1, wherein the elements in the first and second cell regions include switching elements and pixel electrodes.

5. The method according to claim 4, wherein the buffer pattern has a same structure as the switching elements and the pixel electrodes in the first and second cell regions.

6. The method according to claim 1, wherein the elements in the first and second cell regions include color filter layers and a common electrode.

7. The method according to claim 6, wherein the buffer pattern has a same structure as the color filter layers and the common electrode in the first and second cell regions.

8. The method according to claim 1, wherein the buffer pattern includes a plurality of patterns, which are sequentially arranged along the first direction, and each of the plurality of patterns has a rod shape and is formed along a second direction perpendicular to the first direction.

9. The method according to claim 1, wherein a portion of the alignment layer in the first cell region is rubbed after rubbing a portion of the alignment layer in the buffer region.

10. The method according to claim 1, further comprising:
    attaching the first base substrate including the rubbed alignment layer with a second base substrate;
    cutting the attached first and second base substrates along edges of the first and second cell regions to thereby form first and second cells; and
    injecting liquid crystal materials into each of the first and second cells.

11. The method according to claim 10, further comprising disposing of the combined first and second base substrate containing the buffer pattern.

12. The method according to claim 1, wherein a combination of the second cell regions and buffer region have substantially the same dimension as the first cell region in a second direction substantially perpendicular to the first direction.

13. The method according to claim 1, wherein distances between the second cell regions and buffer region are substantially smaller than widths of the second cell regions and buffer region.

14. The method according to claim 1, wherein the second cell regions are symmetrically disposed around the buffer region.

15. The method according to claim 1, wherein the elements in at least one of the first and second cell regions and the buffer pattern in the buffer region have substantially the same thickness.

16. The method according to claim 1, wherein the buffer region has a smaller area than either the first or second cell regions.

17. A method of forming a display device, the method comprising:
    defining first and second cell regions of different sizes and a buffer region on a first base substrate;
    forming elements in the first and second cell regions;
    forming a buffer pattern in the buffer region that has substantially the same thickness as the elements in at least one of the first and second cell regions;
    forming an alignment layer covering the elements and the buffer pattern; and
    rubbing the alignment layer along a first direction.

18. The method according to claim 17, further comprising forming the buffer pattern and the elements in the same process.

19. The method according to claim 17, wherein the buffer pattern includes a plurality of patterns.

20. The method according to claim 19, wherein the plurality of patterns are sequentially arranged along the first direction.

21. The method according to claim 19, wherein the plurality of patterns have substantially identical shapes.

22. The method according to claim 21, wherein each of the plurality of patterns has a rod shape extending in a second direction perpendicular to the first direction.

23. The method according to claim 17, further comprising cutting apart the first and second cell regions and the buffer region and disposing of the buffer region after the first and second cell regions are cut apart.

24. The method according to claim 23, further comprising:
    attaching the first base substrate including the rubbed alignment layer with a second base substrate;
    cutting the attached first and second base substrates along edges of the first and second cell regions to thereby cut apart the first and second cell regions and form first and second cells; and
    injecting liquid crystal materials into each of the first and second cells.

25. The method according to claim 17, wherein a combination of the second cell regions and buffer region have substantially the same dimension as the first cell region in a second direction substantially perpendicular to the first direction.

26. The method according to claim 17, wherein distances between the second cell regions and buffer region are substantially smaller than widths of the second cell regions and buffer region.

27. The method according to claim 17, wherein the second cell regions are symmetrically disposed around the buffer region.

28. A substrate comprising:
   first and second cell regions of different sizes and a buffer region disposed between adjacent second cell regions on a first base substrate;
   elements in the first and second cell regions;
   a buffer pattern in the buffer region; and
   an alignment layer covering the elements and the buffer pattern.

29. The substrate according to claim 28, wherein the first and second cell regions are separated in a first direction.

30. The substrate according to claim 29, wherein the buffer pattern includes a plurality of patterns.

31. The substrate according to claim 30, wherein the plurality of patterns are sequentially arranged along the first direction.

32. The substrate according to claim 30, wherein the plurality of patterns have substantially identical shapes.

33. The substrate according to claim 32, wherein each of the plurality of patterns has a rod shape extending in a second direction perpendicular to the first direction.

34. The substrate according to claim 28, wherein a combination of the second cell regions and buffer region have substantially the same dimension as the first cell region in a second direction substantially perpendicular to the first direction.

35. The substrate according to claim 28, wherein distances between the second cell regions and buffer region are substantially smaller than widths of the second cell regions and buffer region.

36. The substrate according to claim 28, wherein the second cell regions are symmetrically disposed around the buffer region.

37. The substrate according to claim 28, wherein the elements in at least one of the first and second cell regions and the buffer pattern in the buffer region have substantially the same thickness.

38. The substrate according to claim 28, wherein the buffer region has a smaller area than either the first or second cell regions.

39. The substrate according to claim 28, wherein the elements in the first and second cell regions include switching elements and pixel electrodes.

40. The substrate according to claim 39, wherein the buffer pattern has a same structure as the switching elements and the pixel electrodes in the first and second cell regions.

41. The substrate according to claim 28, wherein the elements in the first and second cell regions include color filter layers and a common electrode.

42. The substrate according to claim 41, wherein the buffer pattern has a same structure as the color filter layers and the common electrode in the first and second cell regions.

* * * * *

UNITED STATES PATENT AND TRADEMARK OFFICE
CERTIFICATE OF CORRECTION

| | | |
|---|---|---|
| PATENT NO. | : 7,189,590 B2 | Page 1 of 1 |
| APPLICATION NO. | : 10/963617 | |
| DATED | : March 13, 2007 | |
| INVENTOR(S) | : Won-Gyun Youn et al. | |

It is certified that error appears in the above-identified patent and that said Letters Patent is hereby corrected as shown below:

On the Title Page

In column 1, line 1, under "Foreign Application Priority Data", delete "10-2003-0071061" and substitute --P2003-0071061-- in its place.

Signed and Sealed this

Seventeenth Day of March, 2009

JOHN DOLL
*Acting Director of the United States Patent and Trademark Office*